US006771684B2

(12) United States Patent
Hill

(10) Patent No.: US 6,771,684 B2
(45) Date of Patent: Aug. 3, 2004

(54) COMPACT, FLEXIBLE, RAPID-PULSED, MOLECULAR GAS LASER

(76) Inventor: Alan E. Hill, 17 El Arco Dr., NE., Albuquerque, NM (US) 87123-9542

( * ) Notice: Subject to any disclaimer, the term of this patent is extended or adjusted under 35 U.S.C. 154(b) by 0 days.

(21) Appl. No.: 10/220,541

(22) PCT Filed: Mar. 1, 2001

(86) PCT No.: PCT/US01/06812

§ 371 (c)(1),
(2), (4) Date: Aug. 30, 2002

(87) PCT Pub. No.: WO01/69731

PCT Pub. Date: Sep. 20, 2001

(65) Prior Publication Data

US 2003/0021323 A1 Jan. 30, 2003

Related U.S. Application Data

(60) Provisional application No. 60/186,430, filed on Mar. 2, 2000.

(51) Int. Cl.[7] .............................. H01S 3/22; H01S 3/223
(52) U.S. Cl. ........................................... 372/58; 372/55
(58) Field of Search .............................. 372/29.021, 55, 372/58, 59, 61, 63, 109, 38.02, 38.07

(56) References Cited

U.S. PATENT DOCUMENTS

| | | | |
|---|---|---|---|
| 4,283,686 A | | 8/1981 | Daugherty et al. |
| 4,325,033 A | * | 4/1982 | Shutt .......................... 372/94 |
| 4,561,431 A | | 12/1985 | Atkinson |
| 4,657,722 A | | 4/1987 | Bennett |
| 4,698,518 A | | 10/1987 | Pacala |
| 4,849,984 A | | 7/1989 | Hill |
| 5,040,185 A | | 8/1991 | Hill |
| 5,141,391 A | | 8/1992 | Acton et al. |
| 5,207,671 A | | 5/1993 | Franken et al. |
| 5,343,483 A | | 8/1994 | Farrell et al. |
| 5,367,878 A | | 11/1994 | Muntz et al. |
| 5,394,415 A | | 2/1995 | Zucker et al. |
| 5,640,014 A | | 6/1997 | Sauke et al. |

OTHER PUBLICATIONS

Hill, A.E., "Continuous uniform excitation of medium–pressure $CO_2$ laser plasmas by means of controlled avalanche ionization", *Applied Physics Letters*, Jun. 15, 1973, pp. 670–673, vol. 22, No. 12, American Institute of Physics.

Hill, A.E., "Coupled Beam–Gas Dynamic Ionization Interactions in Continuous Laser Plasmas", *XIX International Conference on Phenomena in Ionized Gases, Invited Papers*, Jul. 10–14, 1989, pp. 372–383, Faculty of Physics, University of Belgrade, Belgrade, Yugoslavia.

Hill, A.E., "Role of Thermal Effects and Fast Flow Power Scaling Techniques in $CO_2$–$N_2$–He Lasers", *Applied Physics Letters*, Jun. 1, 1970, pp. 423–426, vol. 16, No. 11, American Institute of Physics.

Hill, A.E., "Uniform Electrical Excitation of Large Volume High Pressure Gases with Application to Laser Technology", *AIAA 9th Aerospace Sciences Meeting, AAIA Paper No. 71–65*, Jan. 25–27, 1971, pp. 1–5, American Institute of Aeronautics and Astronautics, New York, New York.

Hill, A.E., "Uniform Electrical Excitation of Large–Volume High–Pressure Near–Sonic $CO_2$–$N_2$–He Flowstream", *Applied Physics Letters*, Mar. 1, 1971, pp. 194–197, vol. 18, No. 5, American Institute of Physics.

* cited by examiner

Primary Examiner—David Porta
Assistant Examiner—Davienne Monbleau
(74) Attorney, Agent, or Firm—Jeffrey D. Myers; Peacock, Myers & Adams, P.C.

(57) ABSTRACT

A compact molecular gas laser and circuit apparatus for same.

16 Claims, 7 Drawing Sheets

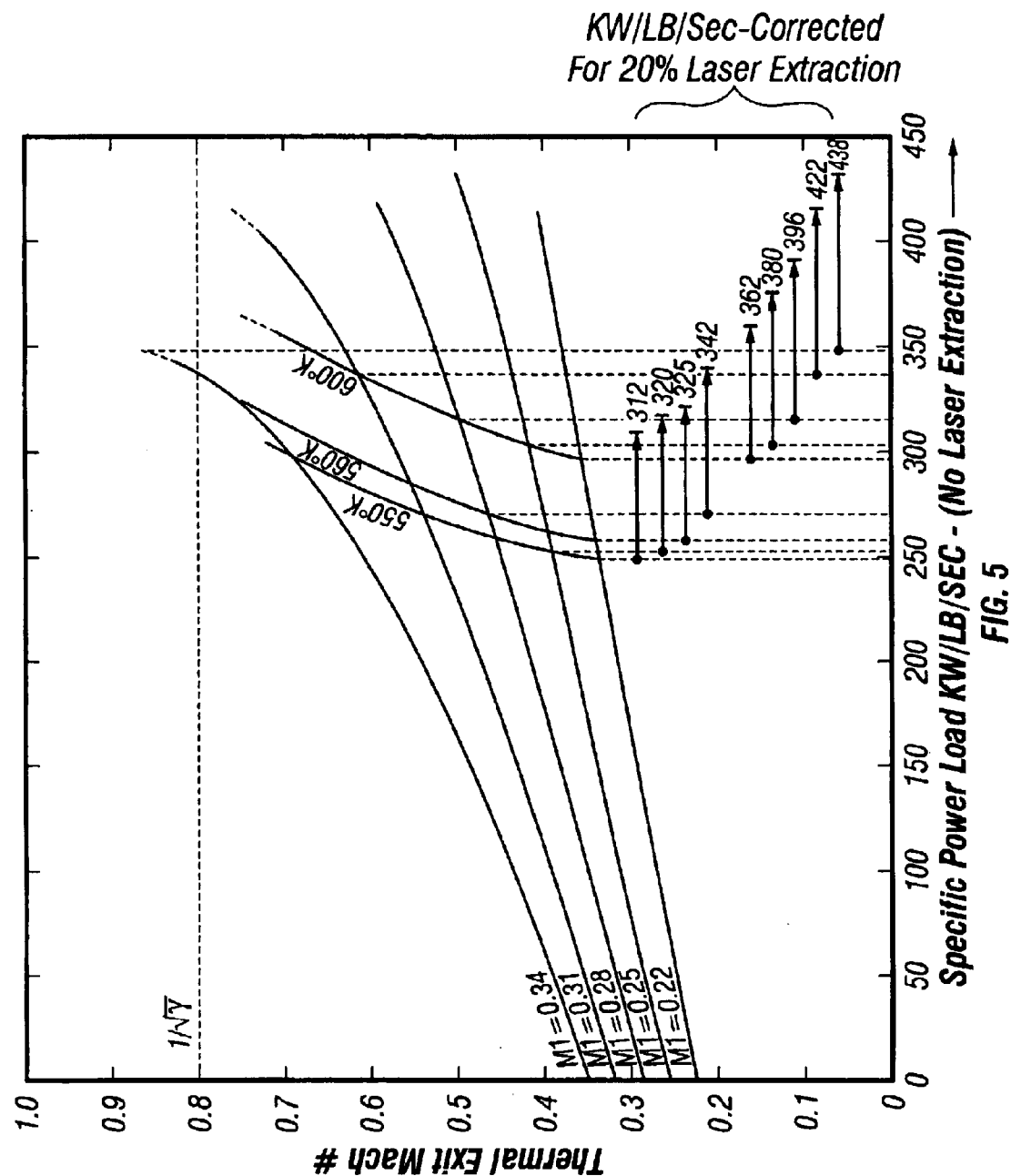

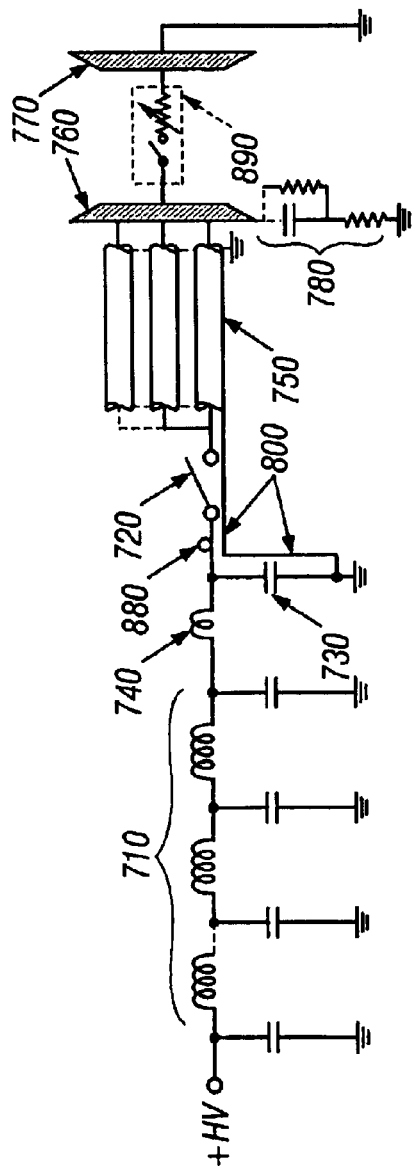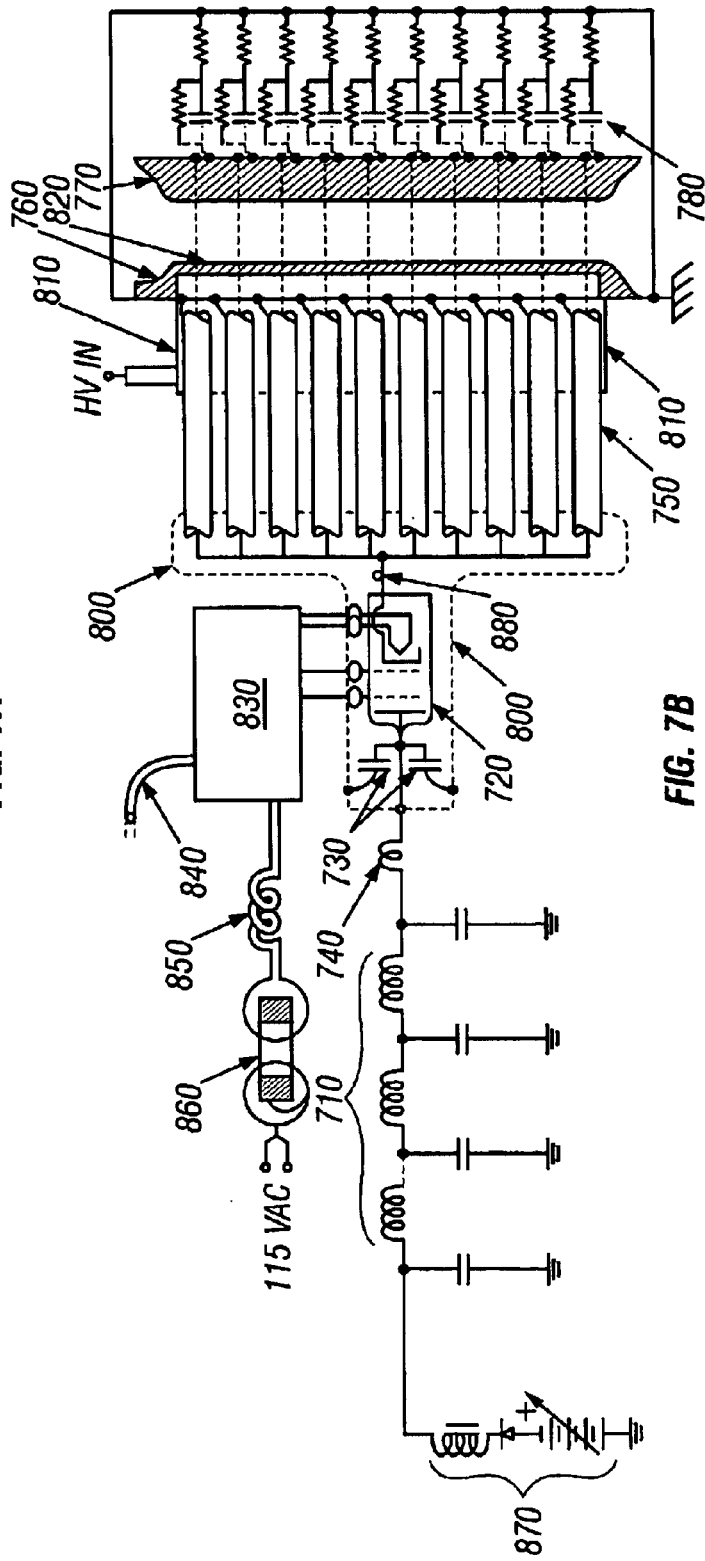
FIG. 7A
FIG. 7B

COMPACT, FLEXIBLE, RAPID-PULSED, MOLECULAR GAS LASER

CROSS-REFERENCE TO RELATED APPLICATIONS

This application claims the benefit of the filing of U.S. Provisional Patent Application Serial No. 60/186,430, entitled "Compact, Flexible, Rapid-Pulsed, Molecular Gas Laser", filed on Mar. 2, 2000, and the specification thereof is incorporated herein by reference.

BACKGROUND OF THE INVENTION

1. Field of the Invention (Technical Field)

The present invention relates to molecular gas lasers.

2. Background Art

Note that the following discussion refers to a number of publications by author(s) and year of publication, and that due to recent publication dates certain publications should not be considered as prior art vis-a-vis the present invention. Discussion of such publications herein is given for more complete background and is not to be construed as an admission that such publications are prior art for patentability determination purposes.

SUMMARY OF THE INVENTION (DISCLOSURE OF THE INVENTION)

The present invention is of a gas laser comprising at least one reciprocating assembly, each reciprocating assembly comprising a driver housing, at least one flow reciprocator, and a driver diaphragm.

The present invention is additionally of a method of producing a laser beam using a gas laser, the method comprising the steps of providing to the gas laser a reciprocating assembly comprising a driver housing and employing within the reciprocating assembly a driver diaphragm and at least one flow reciprocator.

The present invention is also of a circuit for exciting a gas comprising a matched impedance controlled avalanche driver.

A primary object of the present invention is to provide a compact, flexible, rapid-pulsed, molecular gas laser.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings:

FIG. 5 is a plot of Rayleigh heating curves;

FIG. 7A is a schematic of a hybrid pulse former circuit according to an embodiment of the present invention; and FIG. 7B is a schematic of a hybrid pulse former circuit according to another embodiment of the present invention.

Figure 1:
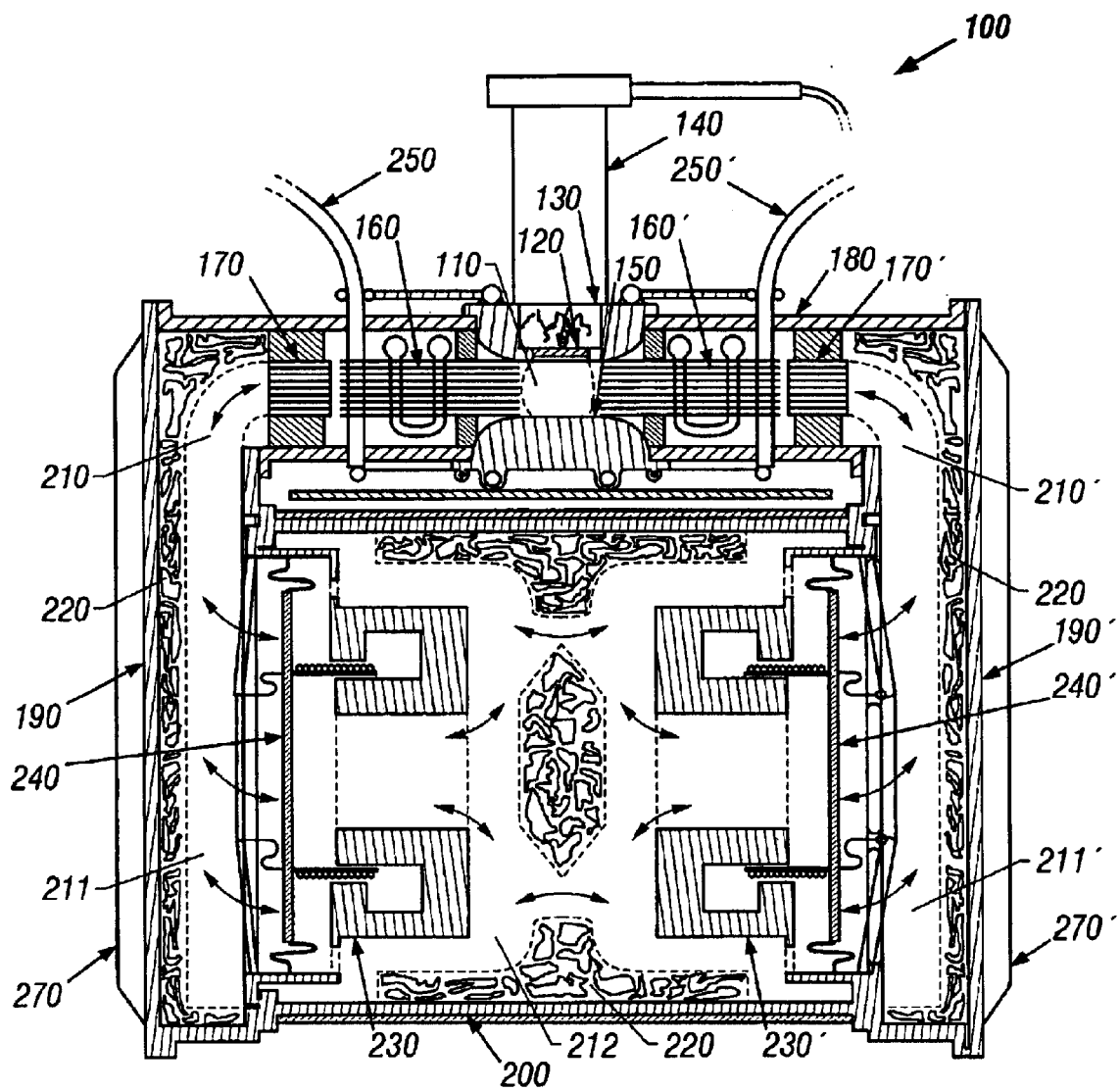
FIG. 1 is a schematic side view of a laser embodiment of the present invention.

DESCRIPTION OF THE PREFERRED EMBODIMENTS (BEST MODES FOR CARRYING OUT THE INVENTION)

The present invention provides for lasers with very high peak power pulses of variable duration, from approximately 0.1 μs to greater than approximately 10 μs, that are continuously pulsable at repetition rates continuously adjustable from approximately 1 pulse per second to greater than 200 pulses per second, thus capable of achieving high average power from approximately 100 watts to greater than 100 kW, and capable of achieving any combination of these parameters from a device packagable into a volume smaller than heretofore possible for a given set of requirements.

The present invention also reduces the cost of the laser over any other laser capable of achieving substantially the same performance using any other approach currently known.

The present invention additionally provides an overall system electrical efficiency higher than any other heretofore achieved when operating at high average power levels; i.e., at 1 kW average or above, while meeting a variety of performance conditions, for example, but not limited to, those given herein.

In one embodiment of the invention, lasers comprising means to extract radiation from the $CO_2$ molecule are used; however, alternative embodiments optionally apply generally to $NO_2$, CO or any gas laser system where large-volume, uniform, plasma excitation is used and where the gas temperature must be held below values easily achievable commensurate with applying large quantities of specific energy to the gas (A. E. Hill, Multi-joule pulses from $CO_2$ lasers: *Applied Physics Letters*, v. 12, no. 9, May 1, 1968).

According to various embodiments, suitably low temperatures are maintained by forcing gas through plasma excitation regions at high flow velocities (A. E. Hill, Role of thermal effects and fast-flow power scaling techniques in $CO_2$—$H_2$—He lasers: *Applied Physics Letters*, v. 16, no. 11, Jun. 1, 1970; A. E. Hill, Uniform electrical excitation of large-volume, high-pressure, near-sonic $CO_2$—$H_2$—He flowstreams: *Applied Physics Letters*, v. 18, no. 5, Mar. 1, 1970; and A. E. Hill, Uniform electrical excitation of large-volume, high-pressure gases with application to laser technology: AIAA 9th Aerospace Sciences Meeting #71-65, New York, Jan. 25–27, 1971). For the case of continuous lasers, gas circulation is optionally achieved by moving the gas through only a small pressure drop, which is relatively easy to accomplish. According to one embodiment, heat due to wasted energy consumed by the electrical discharge that excites the laser is removed by heat exchangers prior to reintroducing the gas within a closed-cycle flow loop back into the laser excitation region. In a variety of embodiments, e.g., for the case of continuous power extraction, only modest gas pressures (on the order of several tens of torr) are needed to produce even high powers (10's of kW), since the lasing molecule is "lased" multiple times in a single pass through the excitation region (which typically comprises an optical cavity). Furthermore, due to low pressure, it is relatively easier to cause the discharge (plasma) to occupy a sufficiently large volume needed to extract a high power laser mode (or modes).

To extract high average power from a rapidly pulsed laser, the task becomes much harder, owing to two primary differences:

(1) The gas pressure must be much higher in order to store a large quantity of available power extractable with only one (or relatively few) recycles of the lasing molecule during a single pulse; i.e., during a single cavity volume exchange period; and (2) A very large amount of energy must be applied to the plasma within a transient time period—an operation that is thermodynamically adiabatic.

The result of (1) is that the plasma does not fill the necessary mode volume uniformly—if at all—without resorting to extreme methods of plasma excitation. According to various embodiments, the present invention specifically provides a method by means of a superior approach.

The result of (2) is that the waste energy (that which is imparted to the plasma but not extracted as laser light) manifests itself as an acoustic shock wave in addition to creating heat. Both heat and acoustic energy must be substantially removed (ideally completely removed) between pulses, a task that typically becomes more severe as the pulse repetition rate is increased.

Heretofore acoustic energy was removed either by means of an extensive array of passive acoustic absorbent baffles and/or by localizing the shock wave to a small volume region by restricting the flow with orifice plates or gas dynamic nozzles. The end result was that either the laser system had to occupy a very large volume, and/or that the pump needed to recycle the gas (called the "prime mover") had to be very powerful in order to move the gas through a large pressure drop created by orifices. This resulted in a device that was expensive, energy-inefficient, and large. It also added many kW of heat to the gas, which had to be removed in addition to the plasma's waste heat. Generally this prior art approach doubled the total power requirement of the laser system, as well as its cost.

According to various embodiments, laser apparatuses of the present invention provide a novel means of moving the gas and absorbing the acoustic shock energy which neither necessitates a large gas volume nor creates a substantial pressure drop. Further, according to various embodiments, apparatuses of the present invention provide for removal of heat created by the plasma that is compatible with the other apparatus components, enabling the total effect as described. Taken together, these advancements revolutionize the capability, flexibility, cost effectiveness, and size reduction of a multi-megawatt peak-high, rep-rate, multi-kW, average, molecular, gas laser.

Method of Gas Cavity Exchange, Cooling, and Acoustic Abatement

Figure 2:
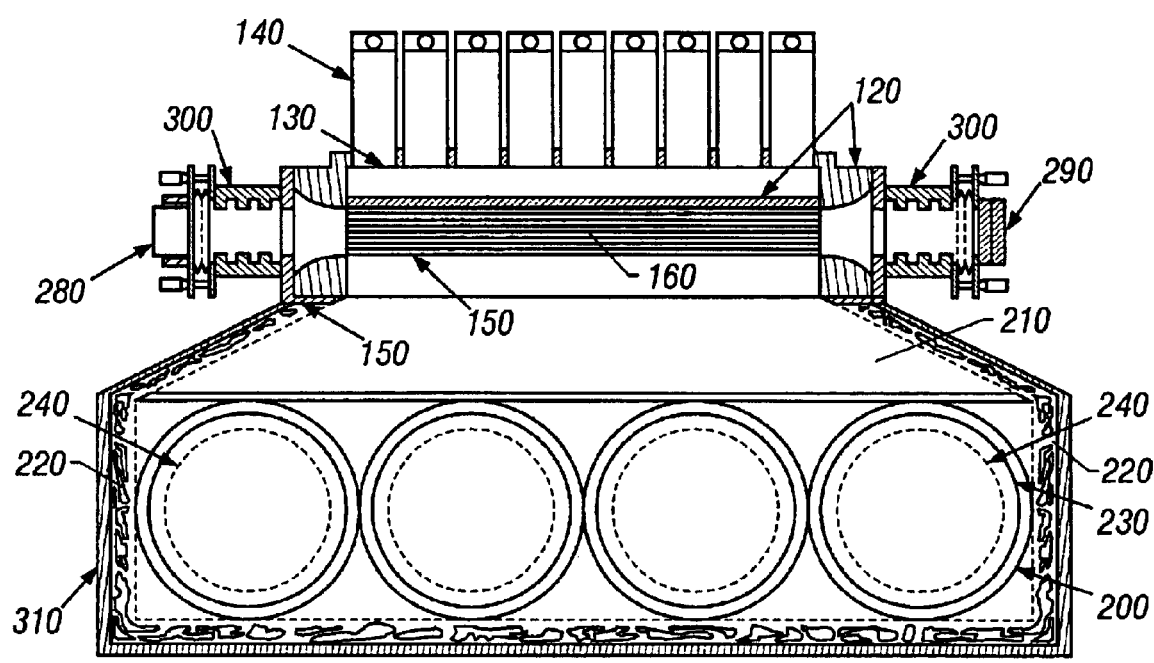
FIG. 2 is a schematic side view of the laser embodiment shown in FIG. 1.
Figure 3:
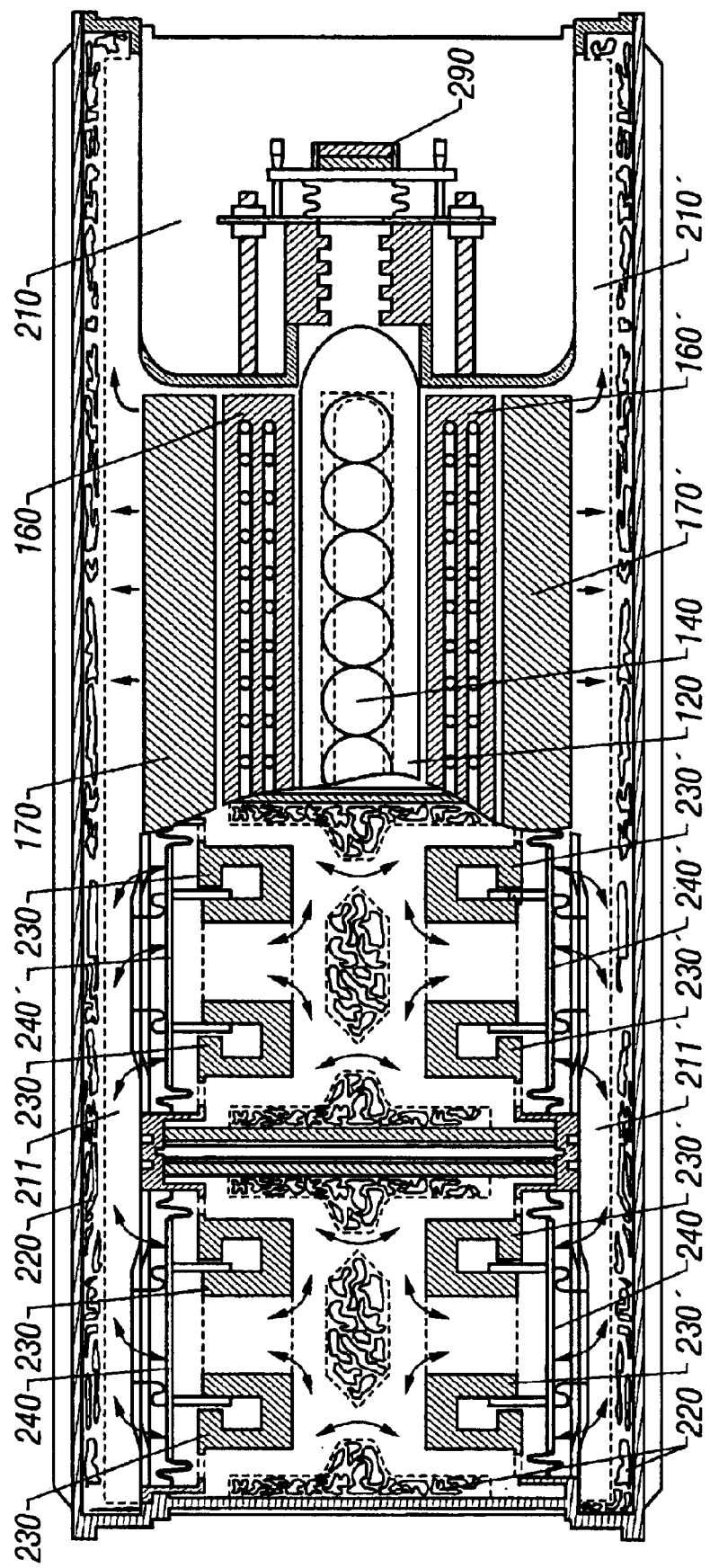
FIG. 3 schematic top view of the laser embodiment shown in FIGS. 1 and 2.

According to an embodiment of the present invention, the usual method of continuously pumping the laser gas flowstream in closed cycle through the cavity followed by heat exchangers is replaced by a process comprising at least two reciprocating steps. This process is briefly described here and in more detail below. Referring to FIG. 1, a laser embodiment of the present invention 100 is shown. Note that the lasing mode volume 110 is bounded by special field-shaping electrodes (top 120 and bottom 150) which form the electrical discharge, and is bounded to the left and right by a dielectric (essentially non-conducting) heat exchanger 160, 160' which protrudes nearly into contact with the plasma volume on either side. Progressing outward, porous-structured catalytic converters 170, 170' follow directly behind each dielectric heat exchanger 160, 160'. The loop is continued on either side by flow ducts at approximately right angles to the discharge channel, and are bridged by cylinders completing two opposing closed paths, referred to as "flow corridors" 210, 210'. These paths, however, are blocked by the at least two "loudspeaker" (like) drivers 230, 230' (linear motors connected to pistons) positioned back-to-back symmetrically about the center of the apparatus. Additionally, a labyrinth surrounded by acoustic "absorber structures," 220 for example, but not limited to, structures comprising a Teflon "chips" filling, is positioned into the side flow ducts and woven into the space between the back-to-back drivers. FIGS. 1, 2, and 3 show three different views of this particular embodiment as described below.

Referring to FIG. 1, a schematic end view of a laser apparatus of an embodiment of the present invention is shown 100. A plasma volume and active laser gain region 110 is positioned centrally between two substantially symmetrical flow corridors 210, 210'. The laser gain region is further positioned between two electrodes, e.g., a field-contoured cathode 120 and a field-contoured anode 150. The electrodes, as shown, are connected to a plurality of parallel "hybrid" pulse drive coax cables 250, 250' and positioned on a rectangular dielectric flow channel 180. Note that the field-contoured anode 120 further comprises an X-ray window. The X-ray window allows for the introduction of X-rays produced by a broad area electron gun (or gun modules) 140 aimed at an X-ray target and scatterer 130. High voltage pulse drive coax cables are suitable for supplying power to the power electron gun (or gun modules) 140.

The two substantially symmetrical flow corridors 210, 210' form an upside-down U-shaped flow path in the laser apparatus. In this particular embodiment, two dielectric heat exchangers (e.g., boron nitride dielectric) 160, 160' are positioned in the flow path, one on either side of the laser gain region 110 (of course, one heat exchanger having two heat exchange regions is within the scope of the present invention). Further bounding the laser gain region 110, are porous structured, catalytic converters 170, 170' through which the gas flows. Past the catalytic converters 170, 170', the flow corridors 210, 210' turn downward forming substantially symmetrical downward legs 211, 211'. The downward legs 211, 211' are positioned on opposing sides of an acoustic chamber 212 and comprise rectangular metal flow ducts 190, 190' (see also, e.g., FIG. 3), which are reinforced with mechanical support ribs 270, 270'. The acoustic chamber 212 comprises at least one cylindrical metal speaker driver housing 200 for mounting at least two loudspeaker flow reciprocators 230, 230' (e.g., linear motors connected to pistons) thereto. The speaker driver housing 200 further comprises, for example, an externally wrapped acoustic damping blanket. As shown in FIG. 1, the flow reciprocators 230, 230' comprise planar honeycomb loudspeaker driver diaphragms 240, 240' and the acoustic chamber 212 further comprises acoustical absorber structures 220 that comprise, for example, but not limited to, TEFLON chips. Note that additional acoustical absorber structures 220 are also positioned throughout the apparatus, primarily along exterior walls of a low pressure enclosure 310.

A schematic side view of the embodiment of FIG. 1 is shown in FIG. 2. This schematic side view shows a variety of components not described in FIG. 1. For example, a cavity mirror 280, a cavity output coupler 290, and a dielectric spacer and mode aperture 300 are shown. This side view further shows nine electron gun modules 140 and four speaker assemblies, each comprising a driver housing 210, flow reciprocators 230, and a driver diaphragm 240. While nine electron guns and four speaker assemblies are shown, other combinations and equivalents thereof are within the scope of the present invention.

A schematic top view of the embodiment of FIG. 1 and FIG. 2 is shown in FIG. 3. This schematic top view, in combination with the views of FIGS. 1 and 2, allows one of ordinary skill in the art to appreciate the aspect ratios of various structures, according to this particular embodiment. Of course, other configurations, aspect ratios, etc., are within the scope of the present invention.

Descriptions of two embodiments of the present invention, referred to herein as Case I and Case II, respectively, follow. According to these embodiments, each case comprises approximately at least three successive steps. Case I: Gas Expansion Followed by "Loudspeaker" Assist.

According to the embodiment of Case I, initially, the speaker drivers are positioned to their limit towards one side—e.g., the left side—and are momentarily stationary. Next, the laser discharge is fired. The resultant laser beam is formed, extracted, and the post-plasma gas volume doubles in temperature from its initial state (near room temperature for the case of $CO_2$). A shock wave emerges from this transiently heated volume, but the laser pulse is extracted before the acoustic disturbance develops. This disturbance, however, in some instances, can ruin the next laser pulse phase integrity if it is not sufficiently dispersed before the next pulse occurs.

Next, the shock is harnessed to provide the first of two cooling operations. Specifically, the expansion (soon to "shock" down to subsonic flow) drives much of the hot gas outward uniformly to the left and to the right into the adjacent heat exchangers. This process happens very quickly compared to the interpulse time, allowing the cooling process to begin.

The expansion waves propagate down through the ducts and impinge substantially simultaneously from opposite directions onto the speaker drivers where they are mostly absorbed, thus generating approximately equal and approximately opposite electrical pulses across each drivers' "voice" coil. A resistor (matched approximately to the net impedance of the drivers) soaks up this electrical pulse, thus dissipating most of the lower frequency content of the acoustic wave. Higher frequency components (containing far less energy) may still persist, and these are absorbed by the anachoic wedges and sidewalls. Multiple reflections absorb diminishingly small remnants of the shock expansion. Dimensions are small such that adequate acoustic loss (approximately 50 dB attenuation needed per pulse) affords operation up to approximately 200 pulse per second repetition rate for a laser that is sized to produce, for example, but not limited to, approximately 5 kW average.

The initial shock cooling is helpful, but in most circumstances not fully adequate to achieve maximum performance. Thus, the loudspeaker drivers optionally serve a second function: that of further cooling the gas. To accomplish this second function, an electrical drive signal is applied to all "voice coils" in unison and in phase to push the gas in one direction (no longer bilaterally symmetric) from the cavity and through one of the heat exchangers and catalytic converters, where it is to be cooled awaiting the next pulse. The gas reentering the cavity from the other side has been pre-cooled since the time of the previous pulse occurred. The audio-drive signals are synchronized in order to have moved all drivers to the extreme opposite lateral extent in time to receive the next pulse, wherein the direction of speaker-driven flow reverses. Audio-drive signals and laser-pulse synchronization are, for example, automatically electronically controlled and may be varied continuously at will.

The functions of both gas pumping and acoustic abatement of multiple reflections can occur simultaneously with the speaker operating both as generator and motor. This is possible because the left-hand and right-hand drivers are electrically driven in phase to produce a net motion in a given direction, but act 180° out of phase as generators when impacted by an acoustic wave. Hence, the dissipation resistor, which is connected to absorb acoustically generated pulses as additive, will not contribute to loading of the audio-drive signal which is phased to cancel across said resistor (see FIG. 4).

Figure 4:
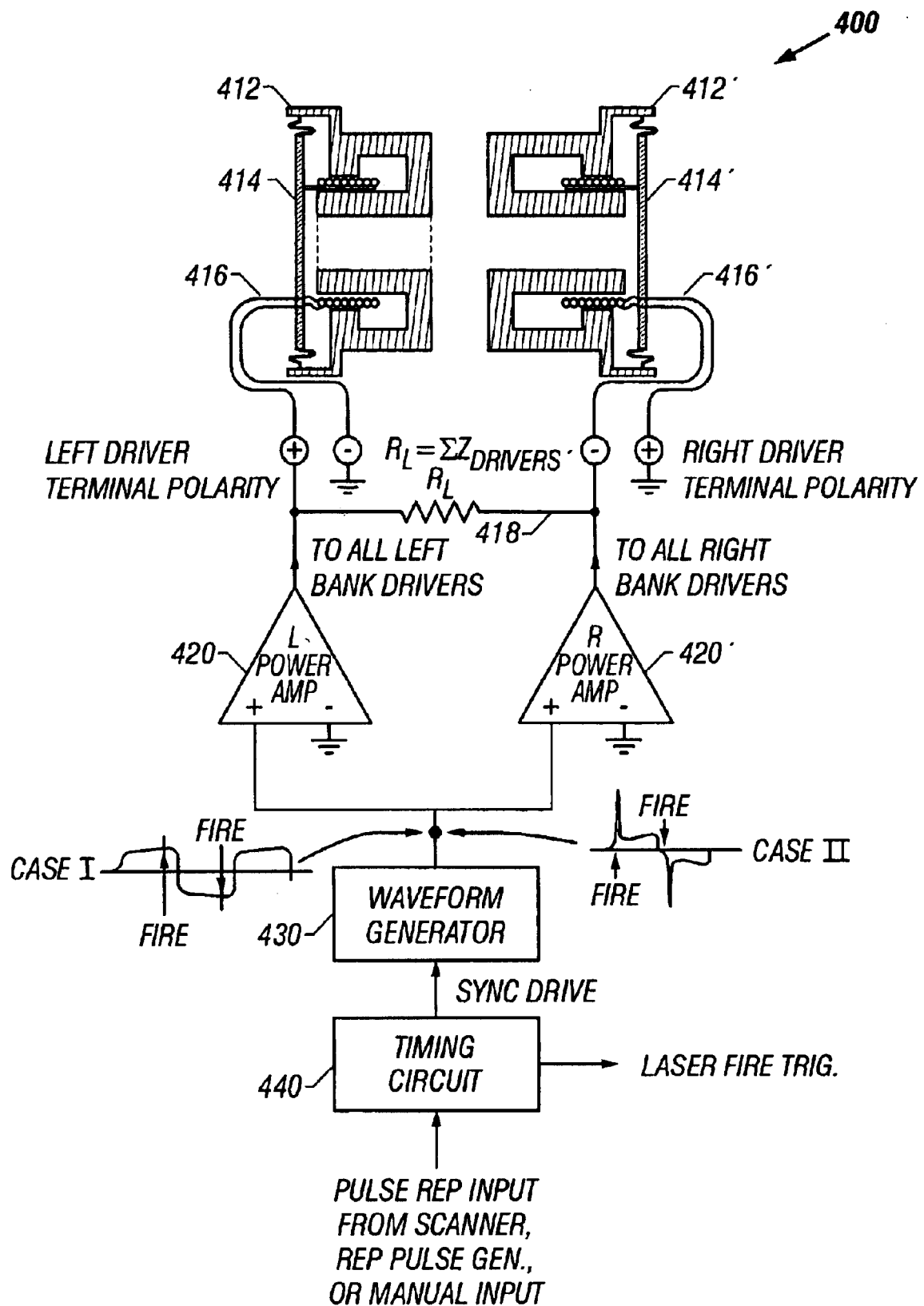
FIG. 4 is a schematic of loudspeaker driver and driver circuit according to an embodiment of the present invention.

In FIG. 4, a schematic for a combination gas reciprocator and acoustical damper driver circuit 400 is shown, suitable for use with the embodiment shown in FIGS. 1 through 3. A cross-sectional view of a cylindrical acoustical speaker assembly 410 is shown near the top of FIG. 4. The assembly 410 comprises opposing driver pairs 412, 412', which comprise diaphragms 414, 414' and a pair of opposing driver circuits 416, 416'. Note that the circuits have opposite polarity, the circuit on the left 416 has "−" to ground while the circuit on the right 416' has "+" to ground.

Referring to FIG. 4, the circuits are connected by a resistor 418, which has a resistance that is approximately equal to the sum of the impedance of the drivers. While only two opposing drivers are shown in FIG. 4, this or other circuits are suitable for driving more than two drivers, e.g., to drive the driver array of FIGS. 1 through 3. Each circuit 416, 416' is driven by a power amplifier 420, 420'. The power amplifiers are driven by a waveform generator 430, which accepts, for example, input from a timing circuit 440. The waveform generator 430 produces, for example, a variety of waveforms, two of which are shown in plots in FIG. 4 as Case I and Case II. Case I, as described herein, comprises a process wherein gas expansion is followed by loudspeaker assist and Case II, as described herein, comprises a process wherein gas expansion is coincident with loudspeaker assist. The timing circuit 440 comprises an output for firing the laser and an input, such as, but not limited to, providing pulse repetition information from, e.g., a scanner, a repetition pulse generator and/or a manual event.

Case II: Gas Expansion Coincident with "Loudspeaker" Assist.

In another embodiment, laser operation comprises a speaker-driven, gas-flow stream that is coincident with the plasma-shock expansion such that the shock tends to drive the flow mostly in the same direction as its pre-existing motion, as a single event. The method of this embodiment invokes a gas dynamic principle know as Raleigh heating, wherein gas already in motion at a relatively high velocity (within the compressible flow range) will further accelerate the flow in that same direction. If the initial velocity exceeds approximately Mach 0.4 to approximately Mach 0.5, the expansion of the plasma can be harnessed to contribute an ever-increasing fraction of its energy toward further accelerating the gas as its initial velocity is increased. Under such circumstances, the heat exchanger may offer more flow resistance as the initial flow velocity is increased. However, in this scheme, a substantially intense, substantially sharp-leading edge is applied to the speaker-drive waveform is used to circumvent this issue. In so doing, more energy is required to reach the necessary extended velocity due to increased pressure drop, but this transient segment of the wave form is, for example, short—only a small fraction of one pump-cycle time. When the driver reaches peak velocity, the laser is then pulsed and the drive flow and expansion velocities are (mostly) additive, but in a non-linear fashion (FIG. 5). With each succeeding pulse, the flow stream reverses, as before. In FIG. 5, Rayleigh heating curves are shown plotted as thermal exit Mach number versus specific power load in kW per lb per second.

Detailed theoretical calculations and experimental data are used to confirm whether the embodiment of Case I or of Case II (or yet another alternative embodiment) works best for any given application. From a theoretical point of view, the first scheme is more straightforward.

For both Case I and Case II, the volume of gas trapped between each speaker pair transmits force, thus effectively coupling the drivers so that they share in doing the work of reciprocating the lasing gas media through the cavity.

Also for both Cases I and II, the driver signals are synchronized to the laser pulse rate according to the requirements for either case by means of the electronic circuit outlined in FIG. 4. The circuit affords real-time variation of the pulse repetition rate—either under manual or automatic control. For example, in the case of selective layer removal (i.e., paint), the repetition rate can be automatically tied to the scan velocity of the laser beam at the point of surface interaction, which in turn may be either manually or machine controlled. The benefit is that thermal damage to the substrate can be automatically eliminated. Moreover, the damage to the substrate may be eliminated by blocking out laser pulses wherever the substrate surface has been reached. The surface status is being monitored in real time by instruments that measure either color or spectral content of the laser plumb.

Plasma Formation and Control

This invention incorporates a special means of forming, pumping, and controlling a plasma which provides the laser gain media. It is based in part on a controlled avalanche process (see, e.g., A. E. Hill, Continuous uniform excitation of medium-pressure $CO_2$ laser plasmas by means of controlled avalanche ionization: *Applied Physics Letters*, v. 22, no. 12, Jun. 15, 1973) but specifically comprises, in one embodiment, for example, an inventive four-step process shown to yield a factor of two higher specific power loading and much greater range of applicability over any other known schemes using the Controlled Avalanche Process.

Consider for example, a $CO_2$ laser embodiment that produces approximately 50 joule pulses of approximately 1.4 microseconds duration and operates at a sustained pulse rate of approximately 200 pulses per second. According to this embodiment, approximately 36 megawatts pulsed at approximately 10,000 watts average power results for an active cavity volume having dimensions of approximately 2"×2"×30". There is no other laser known that approaches such levels of performance.

Briefly, the Controlled Avalanche Process is, in a manner, somewhat similar to an E-beam ionization scheme (see, e.g., K Boyer, C. Fenstermacher, W. Leland, and M. Nutter, Electron-beam-controlled electrical discharge as a method of pumping large volumes of $CO_2$ laser media at high pressure: *Applied Physics Letters*, v. 20, January, 1972) because the Controlled Avalanche Process permits independence of ionization and pump mechanisms, and also their associated E-field parameters. Therefore, a relatively large density of "cold" electrons may be supplied, which are subsequently conducted by application of an electric field whose magnitude is too low to sustain a normal glow discharge (i.e., to create ionization of its own accord). However, instead, the Controlled Avalanche Process serves only to pump the laser transitions by sustaining the electron bath at a low-lying, but optimal, mean temperature for exciting vibrational transitions. Since the ionization phenomenon is no longer associated with this pump E-field, the E-field may be tuned at will to optimize the excitation to any molecular state of any particular molecule. There are many situations where the net efficiency for pumping laser levels (or vibrational transfer levels) occur when the pump E-field lies below that level needed to sustain ionization. Furthermore, this condition provides uniform stable excitation of very large volumes of high-pressure gas without arcing.

It should be noted that, while the electron-beam, ionized, sub-breakdown, field-plasma, formation schemes behave like and exhibit the same favorable characteristics as the Controlled Avalanche based scheme described herein, the E-beam technique is inherently unreliable. For that case, the electrons must pass from an evacuated accelerator region through thin foil windows into the medium (or high) pressure laser cavity. This window is blasted by shock waves as the heated laser plasma expands, and it is also subject to puncture by accidental cavity arcs. This arcing behavior can happen often and without warning, causing significant damage to the equipment and disruption of, for example, an industrial process.

A plasma generator embodiment, described herein, comprises a broad area pulsed X-ray source, two electrodes shaped to prevent field enhancement (such as Rogowsky contouring) and one of which contains an X-ray transmitting window (most ideally made of beryllium), a high voltage pulser to drive the X-ray gun, and a special "hybrid" pulser connected across the electrodes which serves to generate a multi-component pulse to be described. According to this embodiment, the "hybrid" pulser is an apparatus which generates a string of pulses, each comprising a very sharp, narrow, ultra-high, voltage transient, its leading edge followed by a longer, lower-voltage, flat wave form. The long pulse part of this waveform is derived from a pulse-forming network that can be impedance-matched to the plasma load. Both components of the pulse are optionally independently controllable and precisely provide design-specified parameters.

In one embodiment, a particular four-step process operates as follows:

Step 1: An electron-beam generated, broad-area, X-ray pulse is applied to the plasma, and is conducted from its source into the laser through the X-ray window in the electrode. This generates a uniform bed of seed ionization ($Ne_{preion} \geq 10^7$ electrons/cm$^3$) throughout the cavity (and discharge) region.

Step 2: Following a short delay, the uniformly distributed seed ionization is caused to avalanche to the full "working level" electron number density Ne according to design (perhaps $Ne_{pump}=10^{13}$ to $10^{14}$ electrons/cm$^3$) by means of applying an enormously high voltage pulse of ultra-short duration. The exact height and width of this pulse is application-specific, but most likely will fall into the range of 100 KV to 2 MV lasting 5 to 75 nanoseconds. More specifically it provides an initial open-circuit, reduced-field strength of typically 150 Townsends (Td), which amounts to a factor of ~3 to 8 times the glow potential for a particular gas mix. The avalanche is completed as the pulsed potential falls from its maximum field strength (~150 Td unloaded) to the loaded value of perhaps 75 Td for the case of a $CO_2$ laser. This field falls just below the "sparking" potential, but well above the "normal glow" potential.

Step 3: The second function of the hybrid pulse generator takes over the final phase of creating ionization as its applied potential falls from its pulse-forming network charge voltage to one-half that value as the plasma impedance falls to match the pulse-forming network impedance.

Step 4: The system is designed so that plasma impedance comes into match with the pulse-forming network impedance at the particular voltage which provides the optimal E/N condition for pumping the laser transition. Since for this condition E/N falls below the glow potential (i.e., does not contribute to an ionization avalanche), it may be maintained without causing an arc for a specified period of time. Should the ionization level drop unacceptably for the case where the pulse period is very long, multiple controlled avalanche pulses may be added to the first one to sustain ionization in a quasi-continuous mode.

The laser transition is continuously pumped under optimum conditions until terminated by the pulse-forming network. Most typically, the pulse network parameters will be selected to apply the maximum specific power load afforded by thermal bottlenecking (see, e.g., A. E. Hill, Role of thermal effects and fast-flow power scaling techniques in $CO_2$—$H_2$—He lasers: *Applied Physics Letters*, v. 16, no. 11, Jun. 1, 1970) subject to the optimal pump potential and the desired pulse width.

The maximum pulse width is typically limited by the time it takes for the hot gas to expand into the volume external to the laser cavity. In turn, this depends, for example, on the size of the cavity. For example, if a cavity were of 10×10 cm cross section, a few tens of microseconds may bound an achievable upper limit for pulse width.

Figure 6A:
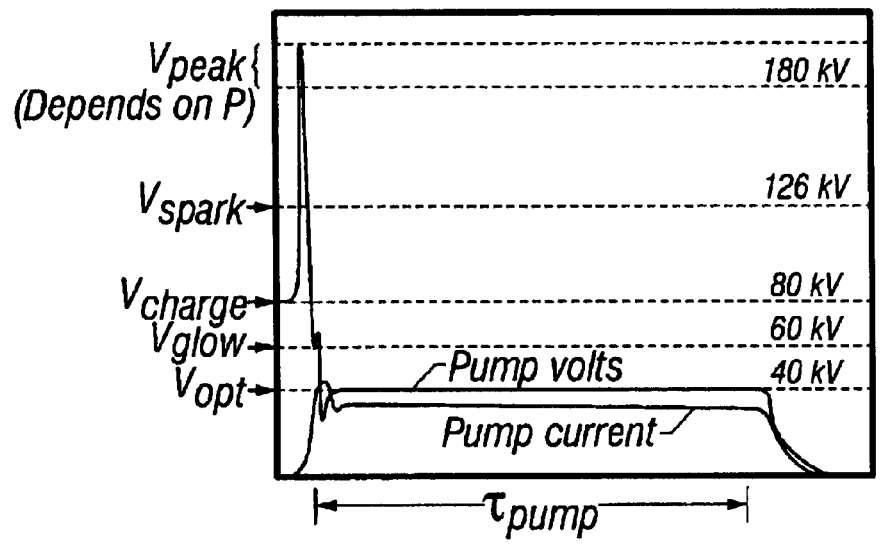
FIG. 6A is a plot of plasma voltage and current waveforms generated by an ideal matched impedance controlled avalanche driver according to an embodiment of the present invention, voltage and current values correspond to parameters for a 0.5 ATM, 10 liter volume laser with a pump current plateau of 12.5 kA and τ of between approximately 100 and approximately 400 nanoseconds.
Figure 6B:
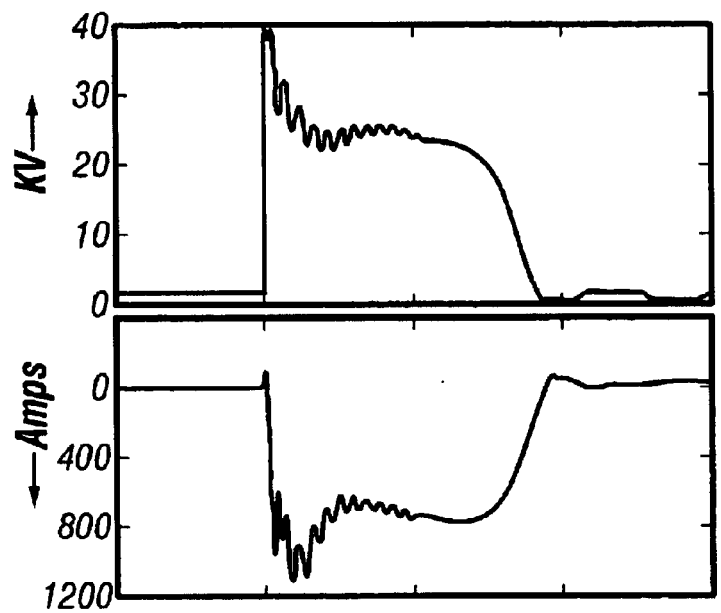
FIG. 6B is a plot of plasma voltage and current waveforms generated by an actual matched impedance controlled avalanche driver according to an embodiment of the present invention, plasma load is approximately 0.5 ATM with a 0.5 liter volume discharge and the upper trace is plotted with 10 kV per division and the lower trace is plotted with 400 A per division, both having a time base of 2 microseconds per division.
Figure 6C:
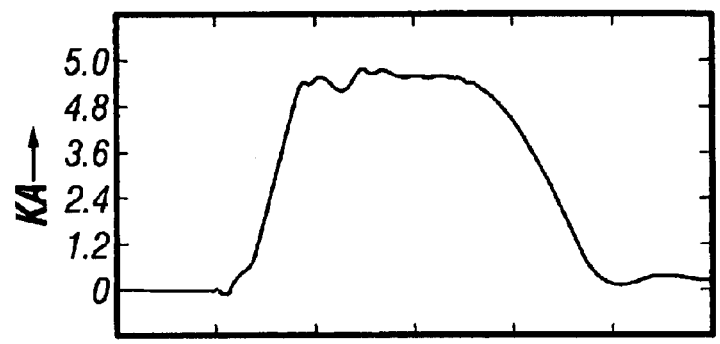
FIG. 6C is a plot of plasma voltage and current waveforms generated by an actual matched impedance controlled avalanche driver according to an embodiment of the present invention, plasma load is approximately 0.5 ATM with a 3 liter plasma volume and the vertical scale is 1200 A per division having a time base of 0.5 microseconds per division.

The discharge voltage/current characteristics leading to establishment of the plasma via the four-step process are shown in FIGS. 6A, 6B and 6C, explained in more detail below. Any network capable of establishing this process within the laser plasma load—herein called the "hybrid pulser"—is within the scope of the present invention.

FIG. 6A shows a plot of plasma voltage and current waveforms generated by an ideal matched impedance controlled avalanche driver according to an embodiment of the present invention, voltage and current values correspond to parameters for a 0.5 ATM, 10 liter volume laser with a pump current plateau of 12.5 kA and τ of between approximately 100 and approximately 400 nanoseconds.

FIG. 6B shows a plot of plasma voltage and current waveforms generated by an actual matched impedance controlled avalanche driver according to an embodiment of the present invention, plasma load is approximately 0.5 ATM with a 0.5 liter volume discharge and the upper trace is plotted with 10 kV per division and the lower trace is plotted with 400 A per division, both having a time base of 2 microseconds per division.

FIG. 6C shows a plot of plasma voltage and current waveforms generated by an actual matched impedance controlled avalanche driver according to an embodiment of the present invention, plasma load is approximately 0.5 ATM with a 3 liter plasma volume and the vertical scale is 1200 A per division having a time base of 0.5 microseconds per division;

Particular circuits that achieve this process by means of direct interaction with the plasma, i.e., wherein the plasma acts to form a controlling circuit element of the "hybrid pulser," are shown in FIG. 7A and FIG. 7B and are within the scope of the present invention.

FIG. 7A shows a schematic of a "simplified" circuit and FIG. 7B shows a schematic of a more elaborate circuit. The circuits of FIGS. 7A and 7B both comprise a pump store pulse forming network ("PFN") 710, a thyatron switch (or spark gap) 720, at least one transfer capacitor 730, a transfer conductor 740, impedance matched PFN transfer cables (also suitable as avalanche pulse forming cables) 750, a laser discharge cathode 760, a laser discharge anode 770, at least one optional snubber circuit 780, a low inductance current return structure 800, and a switch inductance 880. Variable resistor and switch 890 models the plasma breakdown and is an equivalent circuit for the electrical discharge. Additional features shown in FIG. 7B and not in FIG. 7A include, a pulsed X-ray electron gun 810, an X-ray window 820, a floating filament supply and grid drive electronics 830, a fiber optically coupled fire sync signal 840, a common mode rejection filter 850, an isolation transformer 860, and a capacitor charging power supply (or command charge) 870.

Referring to FIG. 6A, a lumped or distributed pulse-forming network (or line) is provided to store the energy which excites the laser transition at (nearly) a constant rate over a specified time. Distributed lines are preferred when the excitation line is short enough (i.e., designed to provide a $\tau_{pump}$ period of approximately a few hundred nanoseconds or less), but may be "lumped" using discrete elements (as shown in FIG. 6) to permit longer pulse lengths (typically 1 to 10 μs). For best discharge stability, a single lumped section should not exceed a time constant $\tau_{sect}=\sqrt{LC} \leq 200$ nanoseconds; the fall pump time period then equals $\tau_{pump}=2N\sqrt{LC}$ where N is the number of discrete LC sections used. Thus, the total pump period as well as the total stored energy may be defined by the number of sections and the total capacitance:

$$\Delta E = \frac{1}{2} N C V_{Charge}^2.$$

This quantity of energy is ideally selected to provide the (near) maximum energy allowed by thermal bottlenecking for the case of $CO_2$ lasers.

The inductance L of the line element, together with the values of C determine $\tau_{pump}$, but also establish the network impedance $$Z_{line} = \sqrt{\frac{L}{C}}.$$

All parameters (including discharge composition and pressure, $\tau_{pump}$, C, L, N and Z) are chosen such that $Z_{line}$ will be matched to $Z_{plasma}$ in its final sub-breakdown condition when the laser transition is being pumped.

According to this embodiment, a desirable arrangement of $Z_{line}=Z_{plasma}$, provides that it is also true that the line will ultimately drive the plasma at one-half its initial charge potential, $\frac{1}{2}V_{charge}$, and conditions are also arranged so that $V_{pump}=\frac{1}{2}V_{charge}$ falls below the glow potential, most optimally $V_{pump} \cong \frac{2}{3}V_{glow}$, (derived from a rigorous kinetics calculation incorporating solutions to the Boltzmann electron energy distribution functions) wherein the reduced plasma electric field is ~25 Td (depending on the gas mix) for the case of $CO_2$.

Referring to FIG. 6A, it is a fortuitous condition of nature that the sparking potential is on the order of two times the glow potential, or (equivalently) the reduced electric field corresponding to breakdown conditions is on the order of two times the value corresponding to glow conditions. Hence, by choosing $V_{pump}<V_{glow}$, we have also arranged that $V_{charge}<V_{spark}$. The PFN may therefore be charged and sustained at $V_{charge}$ without causing an arc if the previously heated and ionized gas has been removed from the cavity prior to charging the capacitors. Hence, a "command" charge circuit is to be used, or an appropriate delay must be incorporated in the case of using a RF capacitor charging circuit.

The pump storage PFN (or PFL) is followed by an intermediate LC section, a low inductance switch (thyatron or spark gap) and a set of parallel cables whose combined impedance $Z_{cables}=Z_{pfn}$. The cables play a dual role. First, they serve as part of a circuit which generates the initial high voltage ionization voltage spike, and like the PFN, the cables interact with the plasma so as to control the collapse of the voltage spike, thus eliminating spark breakdown. Second, the cables provide an impedance matched corridor through which to transfer pump energy from the PFN to the plasma, becoming both passive and transparent during the laser excitation process (i.e., once $Z_{plasma}=Z_{cables}$). Like elements of the PFN, the cables must be precisely specified as to number, impedance, length, and correspondingly, their total capacitance.

Initial voltage spike formation begins when the energy transfer switch (i.e., thyatron) is closed. The intermediate transfer cap $C_t$ initially charged to $V_{charge}$ then dumps through the switch, thus charging the cables. The sum of the cable capacity is selected to be much less than $C_t$, so that its energy gets resonantly transferred to the cables through the self-inductance of the switch $L_t$, which is minimized. In the limit where $C_t>>C_{cable}$, the cables get charged to nearly double $V_{charge}$. Or, by properly selecting the ratio of $C_t/C_{cable}$, the voltage increase ratio can be selected anywhere between 1 and nearly 2. The transfer time, $\tau_{tr}$ is determined by:

$$\tau_{tr} = \pi \sqrt{\frac{L_{sw} C_T \sum_N C_{Cables}}{\left(C_T + \sum_N C_{Cables}\right)}}$$

Ideally, $\tau_{tr}$ should fall between 1 and 2 cable transient times $\tau_C$ where $\tau_C = l\sqrt{L_c C_c}$ and $L_C$ and $C_C$ are the cable's inductance and capacity per unit length, respectively, and l is the length. Finally, l is chosen such that the spike rise time, $\tau_c$, is on the order of avalanche rise time at full breakdown potential. Hence, upon its arrival the cable pulse is reflected by nearly an open circuit since the plasma ionization only the X-ray generated pre-ionization level ($10^7$ electrons/cm³) is present. Hence, the reflected voltage under open circuit conditions heads toward $2 \times V_{cable}$ or in turn $2 \times$ (nearly $2) \times V_{pfn}$, and $V_{pfn} \cong 2 \times V_{glow}$. Hence, the reflected potential is heading toward producing 180 to 200 Td; i.e., 6 to 8 times the reduced field strength of $V_{pump}$ which is approximately 25 Td. As approximately 180 Td is approached, the avalanche breakdown accelerates, and the reflected potential gets reduced because the plasma impedance is becoming reduced, according to the reflection coefficient; i.e., $$V = V_{Cable}\left(1 + \left(\frac{Z_{Cable} - Z_{Plasma}}{Z_{Cable} + Z_{Plasma}}\right)^2\right).$$

It is furthermore possible to balance the selection of all parameters, particularly including the level of overvoltage achieveable at the point of avalanche onset such that the electron number density can be determined. The number density is, in fact, determined such that when the discharge potential has fallen to $V_{pump}$, then $n_e$ has fallen to a value which establishes the discharge impedance which matches $Z_{pfn}$, and $Z_{cable}$.

Then: $j=n_{e(\tau)} \epsilon \upsilon_d$ and $\int\int n_{e(\tau)} \epsilon \upsilon_d dA = \sigma \vec{E}_{pump}$, which in turn establishes:

$$Z_{Plasma} = \left\langle\frac{l_d}{\sigma_\tau A}\right\rangle$$

where:
$\upsilon_d$=electron drift velocity
$\epsilon=1.6 \times 10^{19}$ Coulombs/electron
A=net discharge area
$l_d$=discharge length
$\sigma$=plasma conductivity In order to match all of these parameters, it may be necessary to add one additional controlling circuit (but not in all cases). The additional control can be added by the RC network identified as the "snubber circuit" on FIG. 7. This small capacitive load can be used to reduce and fine tune the maximum potential reached prior to avalanche without affecting any other parameters.

When the cables run out of stored energy, they become an impedance matched line which connects the pump storage PFN to its Z-matched plasma load. The plasma now sees the $V_{pfn}$, which is near $V_{spark}$ and now readily conducts current at this potential since it is highly ionized. The ionization density continues to grow so $V_{plasma}$ continues to drop until the plateau $V_{plasma}=V_{glow}$ is reached. At this point, ionization losses due to recombination plus 3-body attachment exactly equals the volume ionization production rate, and could stabilize. However, we have it arranged so that $Z_{pfn}$ balances $Z_{plasma}$ at a somewhat lower voltage, $V_{pump}$, which is completely stable since ionization is being lost, not gained, and simultaneously the laser excitation process is near optimal.

Since the PFN (or PFL) is perfectly matched at $V_{pump}=\frac{1}{2}V_{charge}$ and $Z_{pfn}=Z_{plasma}$, the line simply deposits its energy in a constant or slightly rippled fashion owing to lumped elements until it runs out of energy and stops abruptly at time $\tau_b$=2N (i.e., the double transverse time for the network).

One more matching condition must be met, namely that intermediate capacitor $C_t$ was chosen to establish the correct cable voltage transfer, and having done this, the inductor $L_t C_t$ must be chosen to preserve $Z_{line}=Z_{L_tC_t}$ for that $L_t C_t$ pair. The $L_t$ in turn restricts that charge transfer coming only from $C_t$.

Now that all parameters are properly selected we have energy balance condition:

$$\int_\tau \left[ \int \vec{E}_\tau \cdot dl \int \int j_\tau \cdot dA \right] d\tau = \frac{1}{2} N \left( C \left( \frac{V_{Charge}}{2} \right) \right)^2$$

All discharge processes are, in turn, controlled by the ionization rate equation:

$$\frac{dn_\varepsilon}{d\tau} = S + (\alpha_{\tau(E/P)} - \alpha_{a(E/P)}) v_{d(E/P)} P n_\varepsilon - \alpha_{r(E/P)} n_\varepsilon^2$$

where, $n_\varepsilon$=electron number density, cm$^{-3}$
S=external ionization sources (X-ray production rate)
$\alpha_{\tau(E/P)}$=reduced Townsend ionization coefficient
$\alpha_{a(E/P)}$=reduced Townsend 2-body attachment coefficient
$v_{d(E/P)}$=electron drift velocity, cm/sec
$\alpha_{r(E/P,\ P)}$=3-body recombination coefficient
P=pressure, torr The coefficients $\alpha_{\tau(E/P)}$, $\alpha_{a(E/P)}$, $\alpha_{r(E/P,\ P)}$ and $v_{d(E/P)}$ are all calculated by means of solving the Boltzman electron energy distribution equation for incremental values of E/N, or $T_d$, which in turn is time dependent.

The network described and drawn in FIG. 7 accurately produces the conditions illustrated in FIG. 6 and in practice it has produced $CO_2$ laser plasmas of an unprecedented quality and power loading. Actual current-voltage characteristics for two different sized lasers are shown in FIGS. 6B and 6C, both of which correspond well with the idealized theoretical representation of FIG. 6A.

Applications of the Invention

Various embodiments of the present invention are suitable for use in servicing and/or cleaning of radioactive contaminated surfaces (e.g., buildings, floors, walls, ceiling, surfaces of equipment, such as gloves, boxes, tanks, machinery (painted or unpainted)). Various embodiments are suitable for use in the aircraft industry, for example, but not limited to, to remove paint from aluminum and composite aircraft skins, helicopter rotors, radomes, other piece parts, and differentially controlled layer removal from Stealth Aircraft surfaces. Various embodiments are suitable for removing paint without primer removal, etc. In the marine industry, various embodiments are suitable for surface paint/corrosion removal from ships and barges and/or special rubber-like surface removal from submarines. Also included are operations for off-shore structures, such as oil rigs, etc.

In the construction industry, various embodiments are suitable for lead-based paint removal from buildings—all surfaces, including wood buildings. With proper operation, the laser will not start fire and provides complete containment of lead contaminated debris. According to various embodiments, lasers of the present invention are suitable for use on bridges, water (or other) outdoor storage tanks and even road texturing.

In the automotive industry, various embodiments are suitable for use on trucks, cars, and all heavy equipment. Further applications include degreasing during fabrication, assembly and paint, coatings and/or wax removal.

Various embodiments are also suitable for use in the medical industry, including, but not limited to, burn debridement, surgical operations (e.g., skin cancer, blemishes, tumors, etc.), cosmetic surgery (e.g., wrinkle reduction, hair removal, etc.), surface sterilization of hands, wounds, etc.

Other applications include art restoration and/or graffiti removal (e.g., for paintings, sculptures, graffiti removal from nearly any surface) and rapid prototyping and/or force free machining. Larger versions of such lasers, are scalable to megawatts average, enabling the following classes of applications: steel industry (e.g., removal of scale from steel rolls); removal of space debris; meteor deflection (Earth protection); rocket/vehicle propulsion from ground or airborne craft; and military applications (e.g., target designators, weapons).

The preceding examples can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A gas laser comprising:
   a gas comprising molecules which lase;
   a laser gain region;
   at least two flow corridors coupled to the laser gain region to accommodate a post-lasing expansion of the gas: and
   an acoustic chamber coupled to said flow corridors by at least two flow reciprocator.

2. The gas laser of claim 1 wherein each of said at least two flow reciprocators comprises a motor and piston and loudspeaker driver diaphragm.

3. The gas laser of claim 1 further comprising acoustic absorption material.

4. The gas laser of claim 1 further comprising at least one element electrically coupled to the flow reciprocators to dissipate acoustic energy absorbed by said flow reciprocators due to the expansion of the gas.

5. The gas laser of claim 4 wherein said at least one element comprises a resistor.

6. The gas laser of claim 4 wherein the flow reciprocators operate substantially 80 degrees out of phase to absorb said acoustic energy.

7. The gas laser of claim 1 further comprising a circuit to drive the flow reciprocators in phase to move the gas.

8. The gas laser of claim wherein said flow corridors comprise at least one heat exchanger.

9. A method of producing a laser beam using a gas laser, the method comprising the steps of:
   causing a gas to lase in a laser gain region of the laser;
   accommodating a resulting expansion of the gas by providing at least two flow corridors coupled to the laser gain region;
   providing an acoustic chamber coupled to the flow corridors by at least two flow reciprocators; and
   absorbing the acoustic energy of the gas using the flow reciprocators.

10. The method of claim 9 wherein the absorbing step comprises employing a motor and piston and loudspeaker driver diaphragm.

11. The method of claim 9 further comprising the step of providing acoustic absorption material to the laser.

12. The method of claim 9 wherein the absorbing step further comprises dissipating the acoustic energy through at least one element electrically coupled to the flow reciprocators.

13. The method of claim 12 wherein the absorbing step further comprises causing the flow reciprocators to move substantially 180 degrees out of phase.

14. The method of claim 9 further comprising the stop of electrically coupling at least one resistor to the flow reciprocators.

15. The method of claim 9 further comprising the step of operating the flow reciprocators in phase to move the gas.

16. The method of claim 9 wherein the accommodating step further comprises passing the gas through at least one heat exchanger.

* * * * *